June 1, 1926.
R. T. PIERCE
ELECTRICAL MEASURING INSTRUMENT
Filed Jan. 3, 1920
1,586,696
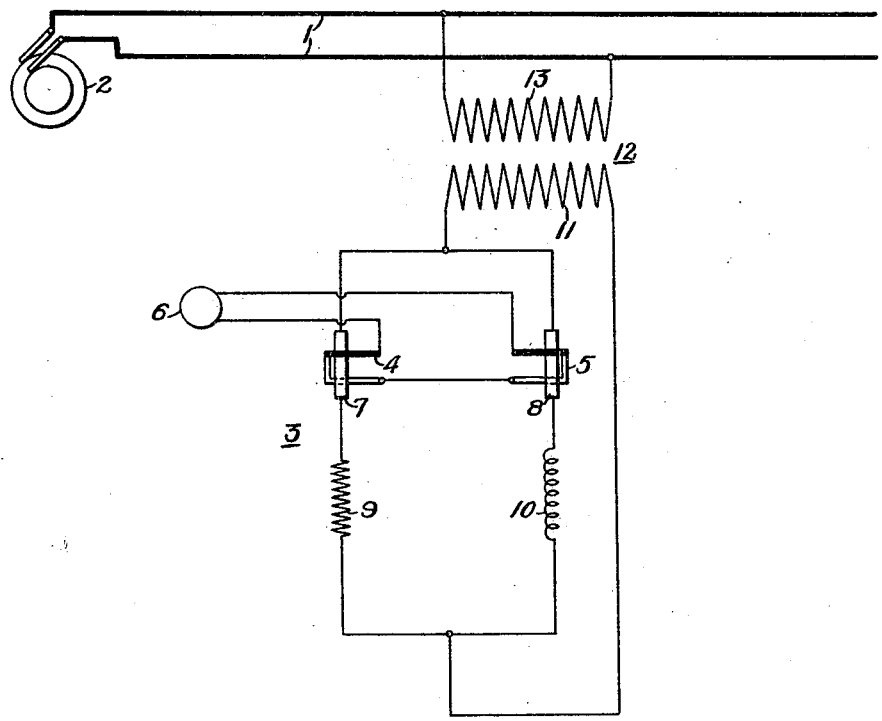
WITNESSES:
J. A. Helsel
J. E. Foster
INVENTOR
Raymond T. Pierce.
BY
Wesley G. Carr
ATTORNEY Patented June 1, 1926.

1,586,696

UNITED STATES PATENT OFFICE.

RAYMOND T. PIERCE, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed January 3, 1920. Serial No. 349,264.

My invention relates to electrical measuring instruments and particularly to frequency meters.

One object of my invention is to provide a device whereby the frequency of an electrical current may be determined.

Another object of my invention is to provide a device whereby the amount of variation from the normal frequency of an electrical current may be determined.

A further object of my invention is to provide a device of the above indicated character that shall be simple and compact in construction and effective in its operation.

In practicing my invention, I provide two thermo-electric couples differentially connected to a direct-current measuring instrument. I provide, further, two heating elements for the thermo-electric couples, one heating element being connected in series with a reactor and the other heating element being connected in series with a resistor, the circuits, thus constituted, being connected across the circuit, the current frequency of which is to be determined. While the voltage of the circuit being metered remains constant, the values of the currents that traverse the respective circuits containing the resistor and the reactor will vary in accordance with the impedance thereof. As the current frequency of the circuit varies, the impedance of the circuit of the reactor varies, and, consequently, the current that traverses the reactor will also vary in accordance with the frequency. Since the energizing of one couple is constant while the energizing of the other couple varies in accordance with the frequency, and since the thermo-couples are differentially connected to the indicating instrument, the values indicated thereby will vary in accordance with the difference between the energizing of both couples, and, therefore, will vary in accordance with the frequency of the current in the circuit connected thereto. The indicating device may be arranged to indicate any value of frequency or amount of variation from a predetermined frequency.

The single figure of the accompanying drawing is a diagrammatic view of a device embodying my invention.

A circuit 1, that is connected to a source 2 of electromotive force, is provided with a frequency-measuring device 3. The measuring device 3 comprises two oppositely connected thermo-electric couples 4 and 5 and an indicating instrument 6 connected thereto. A plurality of electrical heater elements 7 and 8 are provided for heating the hot junctions of the thermo-couples 4 and 5, respectively. A resistor 9 and a reactor 10 are connected in series with the heater elements 7 and 8, respectively, across the terminals of the secondary winding 11 of a potential transformer 12, the primary winding 13 of which is connected across the conductors of a circuit 1.

While the voltage of the circuit 1 remains constant, the voltage across the resistor 9 and the heater 7 and across the reactor 10 and the heater 8 also remains constant. However, if the frequency varies, the value of the current that traverses the circuit of the reactor will decrease because of the increased impedance that is caused by the self-induction of the reactor 10. The resulting decreased value of current permits a reduction in the temperature of the thermo-couple 5 while the temperature of the couple 4 is maintained at a constant value, and, consequently, the potential that is produced across the winding of the indicating instrument 6 is increased in accordance with the difference of the electromotive forces that are produced in the two thermo-couples. The thermal electromotive forces of the couples 4 and 5 are adapted to be equal and opposite for a predetermined frequency. Thus, when the thermal electromotive force of one couple changes with respect to the other, the instrument 6 will indicate the change in frequency. Changes in voltage on the circuit 1 will not affect the operation of the device because the heating devices 7 and 8 are similarly affected by changes in voltage. Thus, one serves as a compensator for the other for changes in voltage. The indicating device 6 may be calibrated to indicate, either the amount of variation from a predetermined value of frequency, or, the actual frequency that obtains in the circuit 1.

Although I have shown a circuit containing the various elements that comprise my invention, I do not limit it to the arrangement as shown, as various modifications may be made therein, without departing from the spirit and scope of the invention as set forth in the appended claims.

I claim as my invention:

1. In a frequency meter, the combination with two heater elements, two thermo-electric couples and an electro-responsive device, of a reactor connected in series with one heater element and a resistor connected in series with the other heater element across the circuit to be metered.

2. In a frequency meter, the combination with an electro-responsive device and two thermo-electric couples differentially connected thereto, of non-inductive means for heating one of the couples in accordance with a predetermined frequency and inductive means for heating the other couple in accordance with variations from said frequency of an applied current.

3. In a frequency meter, the combination with an electro-responsive device and two thermo-electric couples differentially connected thereto, of two heating elements for energizing the thermo-electric couples, a resistor operatively connected to one heating element, and a reactor operatively connected to the other heating element.

4. In a frequency meter for an electric circuit, the combination with an electro-responsive device and two thermo-electric couples differentially connected thereto, of two heating elements for the thermo-couples, one of which is so operatively connected to a reactor as to be heated in accordance with the frequency of the current traversing the circuit.

In testimony whereof, I have hereunto subscribed my name this 23rd day of December 1919.

RAYMOND T. PIERCE.